US008027780B2

(12) United States Patent
Whitney et al.

(10) Patent No.: US 8,027,780 B2
(45) Date of Patent: Sep. 27, 2011

(54) METHOD AND SYSTEM FOR CONTROLLING TORQUE DURING A VEHICLE LAUNCH CONDITION

(75) Inventors: Christopher E. Whitney, Highland, MI (US); Todd R. Shupe, Milford, MI (US); Vivek Mehta, Bloomfield Hills, MI (US); Kristian Keary, Troy, MI (US); Richard B. Jess, Haslett, MI (US)

(73) Assignee: GM Global Technology Operations LLC

( * ) Notice: Subject to any disclaimer, the term of this patent is extended or adjusted under 35 U.S.C. 154(b) by 330 days.

(21) Appl. No.: 12/434,127

(22) Filed: May 1, 2009

(65) Prior Publication Data

US 2010/0280738 A1 Nov. 4, 2010

(51) Int. Cl.
*G06F 19/00* (2011.01)
*G06F 19/24* (2011.01)

(52) U.S. Cl. ........................................ 701/110; 123/436

(58) Field of Classification Search .................... 701/54, 701/102, 110; 123/436, 492, 493
See application file for complete search history.

(56) References Cited

U.S. PATENT DOCUMENTS 5,529,548 A * 6/1996 Mack .............................. 477/84
6,701,246 B2 * 3/2004 Riedle et al. .................. 701/110

* cited by examiner

*Primary Examiner* — Mahmoud Gimie

(57) ABSTRACT

A method and control module for controlling an engine includes a requested torque module that generates a requested torque and a maximum toque capacity module that determines a maximum torque capacity corresponding to a maximum torque capacity of the engine. A launch trim torque threshold determination module determines a launch trim torque threshold. A comparison module that compares the requested torque and the launch trim torque threshold. An output module that applies a fast rate limit to the requested torque up to the launch trim threshold when the requested torque is less than the launch trim torque threshold and a shower rate limited torque request when the requested torque is greater than the launch trim torque threshold.

18 Claims, 5 Drawing Sheets

METHOD AND SYSTEM FOR CONTROLLING TORQUE DURING A VEHICLE LAUNCH CONDITION

FIELD

The present invention relates generally to internal combustion engines and, more particularly, to the control of torque during launch conditions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide a rapid response to control signals or coordinate engine torque control among various devices that affect the engine torque output.

Moving the vehicle from zero velocity to a desired velocity is referred to as a launch. Making the launch smooth "feeling" to the driver is important. Obtaining the smooth feeling is related to the power provided by the engine. The power should rise at an acceptable rate and not overshoot and then come back down. When overshoot occurs the vehicle response is non-linear and lurches followed by lagging feeling.

If the power rises too slowly the vehicle will feel sluggish. If the power rises too fast then the driver may be uncomfortable. Obtaining a smooth launch feeling is easily delivered in an accelerator pedal-to-throttle mapped system. Obtaining a smooth feeling in a system where the throttle and other airflow actuators are controlled by a torque request is difficult with gasoline engines because of manifold and cylinder filling response to times an air actuator change. The manifold has some delay associated with obtaining the desired power when requested. Furthermore the hydrodynamic torque converter in automatic transmissions can provide transient control issues because of the rapid engine speed change on launch.

SUMMARY

In one aspect of the disclosure, a method of controlling an engine includes generating a driver requested torque, determining a maximum torque capacity corresponding to a maximum torque capacity of the engine, determining a launch trim torque threshold, when the requested torque is less than the launch trim torque threshold, applying a fast rate limit to the driver requested torque up to the launch trim torque threshold, and when the requested torque is greater than the launch trim torque threshold, applying a slow rate limit to the driver requested torque.

In another aspect of the disclosure an engine includes a requested torque module that generates a requested torque and a maximum toque capacity module that determines a maximum torque capacity corresponding to a maximum torque capacity of the engine. A launch trim torque threshold determination module determines a launch trim threshold torque. A comparison module that compares the requested torque and the launch trim torque threshold. An output module that applies a fast rate limit to the requested torque up to the launch trim threshold when the requested torque is less than the launch trim torque threshold and a slow rate limited torque request when the requested torque is greater than the launch trim torque threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

Figure 1:
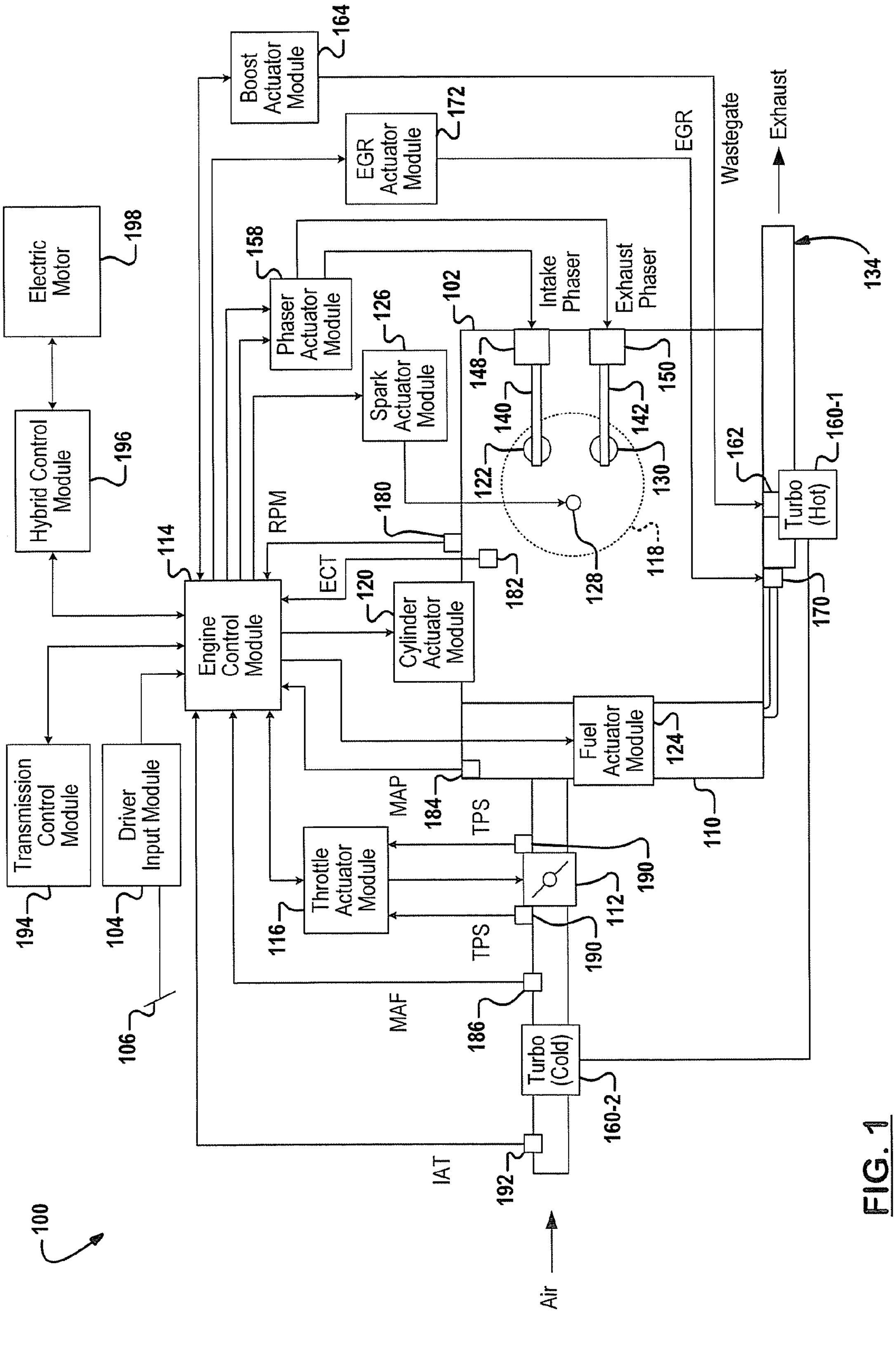
FIG. 1 is a functional block diagram of an exemplary engine system according to the principles of the present disclosure.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary engine system 100 is presented. The engine system 100 includes an engine 102 that combusts an air/fuel mixture to produce drive torque for a vehicle based on a driver input module 104. The driver input module 104 may be in communication with an acceleration pedal sensor 106. The acceleration pedal sensor generates a signal corresponding to the amount the driver moves the acceleration pedal which corresponds to the amount of acceleration the vehicle operator desires. The sensor 106 may have an output correspond to zero all the way up to a maximum acceleration pedal signal.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. The mass air flow signal can be used to obtain the air density. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

Figure 2:
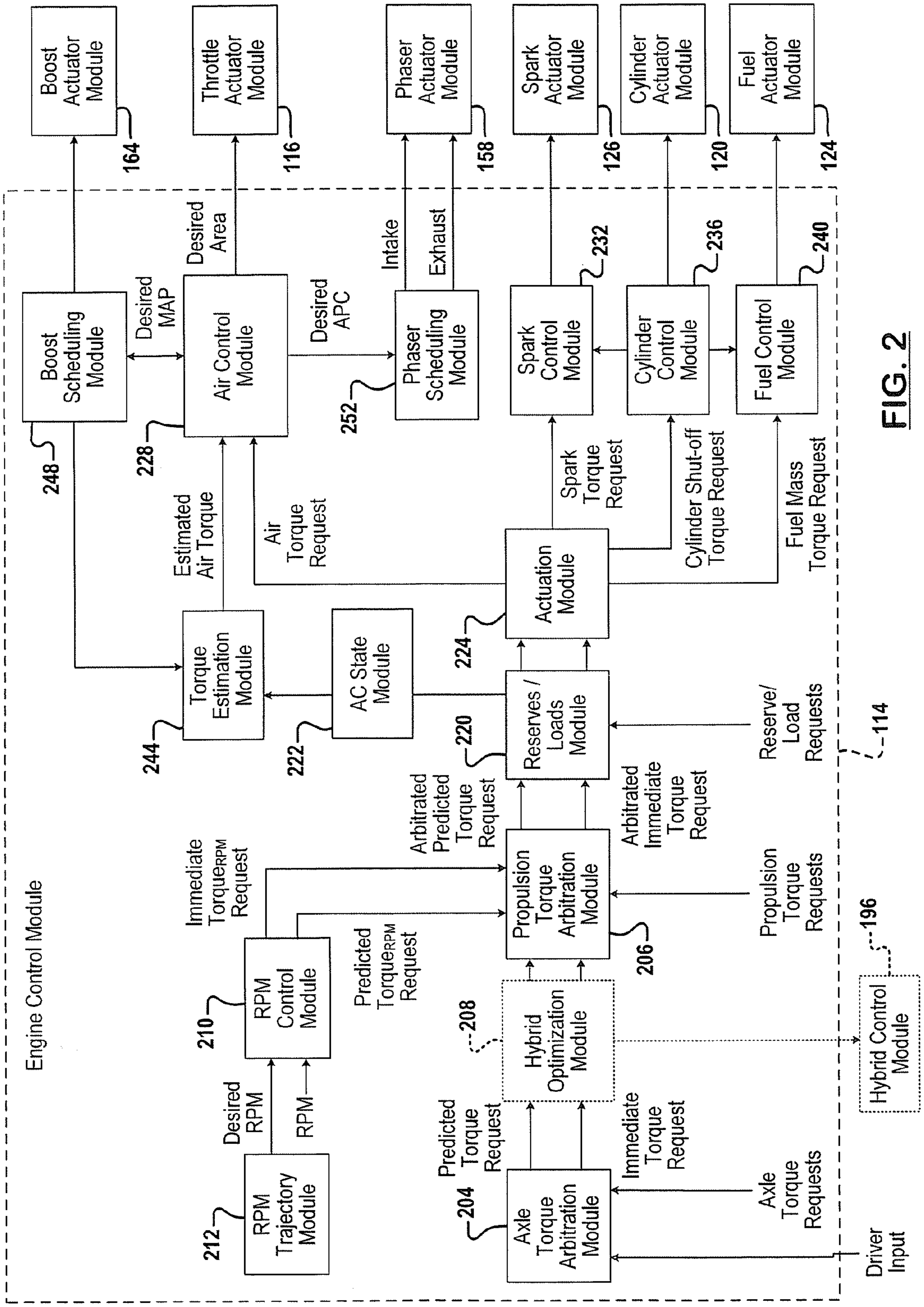
FIG. 2 is a functional block diagram of an exemplary engine control system according to the principles of the present disclosure.

Referring now to FIG. 2, a functional block diagram of an exemplary engine control system is presented. An exemplary implementation of the ECM 114 includes an axle torque arbitration module 204. The axle torque arbitration module 204 arbitrates between a driver input from the driver input module 104 and other axle torque requests. For example, the driver input may be based on position of an accelerator pedal. The driver input may also be based on cruise control, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by chassis stability control systems. Axle torque requests may further include engine shutoff requests, such as may be generated when a critical fault is detected or when the engine control did not provide the desired engine torque.

The axle torque arbitration module 204 outputs a predicted torque and an immediate torque requests based on the results of arbitrating between the received torque requests. The predicted torque request is the amount of torque that the ECM 114 prepares the engine 102 to generate in a smooth filtered-like manner with optimal fuel economy given the available actuators. The immediate torque request is the amount of currently desired torque, which should be achieved with fast accurate control and may sub-optimize fuel economy.

The immediate torque request may be biased to be less than the predicted torque request to provide torque reserves, as described in more detail below, and to meet temporary torque reductions. For example only, temporary torque reductions may be requested when the transmission control module requires torque to be removed from the engine to reduce the engine speed on a transmission gear shift.

The immediate torque may be achieved by varying engine actuators that respond quickly, while slower engine actuators may be used to prepare for the predicted torque. For example, in a gas engine, spark advance may be adjusted to produce torque changes quickly. However, airflow actuators such as throttle, turbo chargers and cam phasers affect the torque output more slowly because changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve 112 can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a fast actuator. The predicted torque is thereby achieved without waiting for a change in torque to result from an adjustment of one of the slower actuators.

The axle torque arbitration module 204 may output the predicted torque and immediate torque requests to a propulsion torque arbitration module 206. In various implementations, the axle torque arbitration module 204 may output the predicted torque and immediate torque requests to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torque requests. The propulsion torque arbitration module 206 may generate an arbitrated predicted torque request and an arbitrated immediate torque request. The arbitrated torque request may be generated by selecting a winning request from among received requests. Alternatively or additionally, the arbitrated torque requests may be generated by modifying one of the received requests based on another one or more of the received requests.

Other propulsion torque requests may include torque reduction requests for engine over-speed protection, torque increasing requests for stall prevention, and torque reduction requests by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected or when the engine control did not provide the desired engine torque. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine. The propulsion torque arbitration module 206 may still receive these shutoff requests so that, for example, appropriate data can be fed back to other torque requestors. For example, all other torque requestors may be informed that they have lost arbitration.

An RPM (engine speed) control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque requested by the axle torque arbitration module 204 is less than a calibratable torque value.

The RPM control module 210 receives a desired RPM from an RPM trajectory module 212, and controls the predicted and immediate torque requests to reduce the difference between the desired RPM and the actual RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. Various engine operating conditions may affect the engine torque output. To create these conditions, the reserves/loads module 220 may create a torque reserve by increasing the predicted torque request.

For example only, a catalyst light-off process or a cold start emissions reduction process may require retarded spark advance for an engine. The reserves/loads module 220 may therefore increase the predicted torque request to counteract the effect of that spark advance on the engine torque output. In another example, the air/fuel ratio of the engine may be directly varied, such as by an intrusive diagnostic. Corresponding torque reserve requests may be made to prepare the engine for offset changes in the engine torque output during these processes.

The reserves/loads module 220 may also create a reserve in anticipation of a future load, such as the engagement of the air conditioning compressor clutch or power steering pump operation. The reserve for air conditioning (A/C) clutch engagement may be created when the driver first requests air conditioning. Then, when the A/C clutch engages, the reserves/loads module 220 may add the expected load of the A/C clutch to the immediate torque request. An air-conditioning state module 222 may generate an air-conditioning state signal and provide the air-conditioning state signal to the reserve/load module signal 220. The air-conditioning state may change the maximum torque capacity of the vehicle. The air-conditioning state may also be communicated to the torque estimation module 244.

An actuation module 224 receives the predicted and immediate torque requests from the reserves/loads module 220. The actuation module 224 determines how the predicted and immediate torque requests will be achieved. The actuation module 224 may be engine type specific, with different control schemes for gas engines versus diesel engines. In various implementations, the actuation module 224 may define the boundary between modules prior to the actuation module 224, which are engine independent, and modules that are engine dependent.

For example, in a gas engine, the actuation module 224 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the mass of air per cylinder changes.

In various implementations, the actuation module 224 may generate an air torque request based on the predicted torque request. The air torque request may be equal to the predicted torque request, causing air flow to be set so that the predicted torque request can be achieved by changes to other actuators.

An air control module 228 may determine desired actuator values for slow actuators based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

In gas systems, the actuation module 224 may also generate a spark torque request, a cylinder shut-off torque request, and a fuel mass torque request. The spark torque request may be used by a spark control module 232 to determine how much to retard the spark (which reduces the engine torque output) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly. The cylinder control module 236 may also instruct a fuel control module 240 to stop providing fuel for deactivated cylinders and may instruct the spark control module 232 to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel mass torque request may be used by the fuel control module 240 to vary the amount of fuel provided to each cylinder. For example only, the fuel control module 240 may determine a fuel mass that, when combined with the current amount of air per cylinder, yields stoichiometric combustion. The fuel control module 240 may instruct the fuel actuator module 124 to inject this fuel mass for each activated cylinder. During normal engine operation, the fuel control module 240 may attempt to maintain a stoichiometric air/fuel ratio.

The fuel control module 240 may increase the fuel mass above the stoichiometric value to increase engine torque output and may decrease the fuel mass to decrease engine torque output. In various implementations, the fuel control module 240 may receive a desired air/fuel ratio that differs from stoichiometry. The fuel control module 240 may then determine a fuel mass for each cylinder that achieves the desired air/fuel ratio. In diesel systems, fuel mass may be the primary actuator for controlling engine torque output.

The approach the actuation module 224 takes in achieving the immediate torque request may be determined by a mode setting. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the immediate torque request and attempt to achieve the predicted torque request. The actuation module 224 may therefore set the spark torque request, the cylinder shut-off torque request, and the fuel mass torque request to the predicted torque request, which maximizes torque output for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 may attempt to achieve the immediate torque request by adjusting only spark advance. The actuation module 224 may therefore output the predicted torque request as the air torque request and the immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 224 may output the predicted torque request as the air torque request and the immediate torque request as the spark torque request. In addition, the actuation module 224 may generate a cylinder shut-off torque request that is low enough to enable the spark control module 232 to achieve the immediate torque request. In other words, the actuation module 224 may decrease the cylinder shut-off torque request (thereby deactivating cylinders) when reducing spark advance alone is unable to achieve the immediate torque request.

In the auto actuation mode, the actuation module 224 may decrease the air torque request based on the immediate torque request. For example, the air torque request may be reduced only so far as is necessary to allow the spark control module 232 to achieve the immediate torque request by adjusting spark advance. Therefore, in auto actuation mode, the immediate torque request is achieved while allowing the engine 102 to return to the predicted torque request as quickly as possible. In other words, the use of relatively slowly-responding throttle valve corrections is minimized by reducing the quickly-responding spark advance as much as possible.

A torque estimation module 244 may estimate torque output of the engine 102. This estimated torque may be used by the air control module 228 to perform closed-loop control of engine air flow parameters, such as throttle area, MAP, and phaser positions. For example only, a torque relationship such as $$T=f(APC,S,I,E,AF,OT,\#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

While the actual spark advance may be used to estimate torque, when a calibrated spark advance value is used to estimate torque, the estimated torque may be called an estimated air torque. The estimated air torque is an estimate of how much torque the engine could generate at the current air flow if spark retard was removed (i.e., spark advance was set to the calibrated spark advance value) and all cylinders were being fueled.

The air control module 228 may generate a desired manifold absolute pressure (MAP) signal, which is output to a boost scheduling module 248. The boost scheduling module 248 uses the desired MAP signal to control the boost actuator module 164. The boost actuator module 164 then controls one or more turbochargers and/or superchargers. The boost scheduling module 248 may communicate a boost status signal to the air control module 228 and may also provide a boost status signal to the torque estimation module 244.

The air control module 228 may generate a desired throttle area signal, which is output to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may also generate a desired air per cylinder (APC) signal, which is output to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},APC,I,E,AF,OT,\#). \quad (2)$$

This relationship may be embodied as an equation and/or as a lookup table. The air/fuel ratio (AF) may be the actual ratio, as indicated by the fuel control module 240.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

Figure 3:
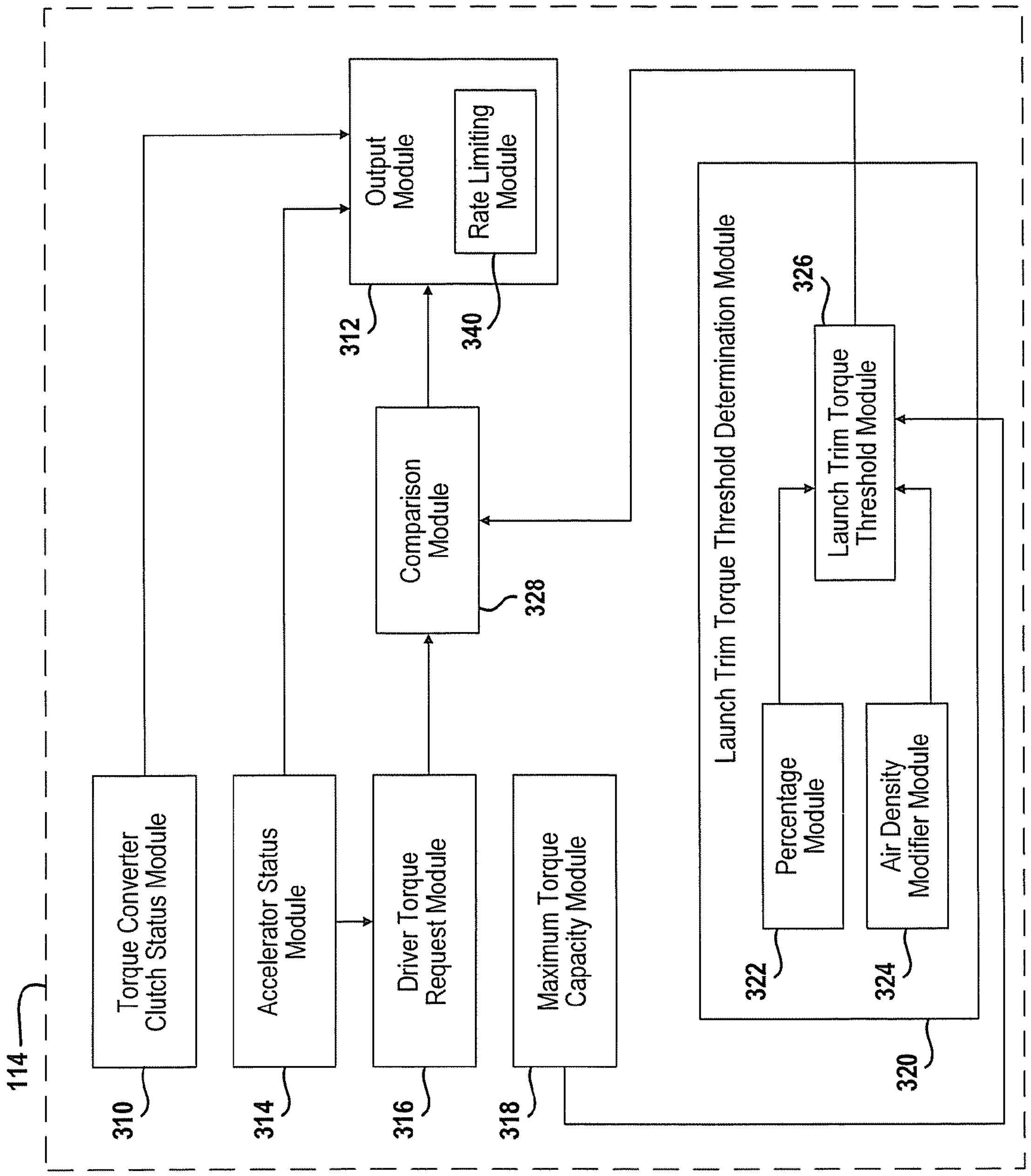
FIG. 3 is a high-level block diagrammatic view of the engine control module 114 simplified to the specifics of the present disclosure.

Referring now to FIG. 3, the engine control module 114 is illustrated in further detail for controlling the torque using the launch trim threshold. The launch trim threshold may be used to shape the driver torque request on a vehicle launch to provide optimal launch performance in a system where actuators are scheduled by torque. A torque convertor status module 310 communicates a signal to an output module 312. The torque converter status module 310 determines a status of the torque converter clutch. If the torque converter clutch is in a locked state or controlled slip state, the speed of the engine will not change as rapidly. The controlled slip state may allow the engine to act as a locked converter. This allows the airflow through the manifold to catch up. Thus, the shaped torque request does not need to have as much (if any) rate limiting applied.

An accelerator status module 314 generates a signal corresponding to the status of the accelerator pedal. The rate of change of the accelerator pedal may be determined as well as the accelerator pedal position as a percentage of its maximum position. When the accelerator pedal transitions to a maximum position and potentially at a maximum rate, the launch trim threshold may be scheduled to a high value so that the slower rate limit in the second stage is not applied.

A driver torque request module 316 generates a driver torque request which may be based upon the accelerator's status among other things. The driver torque request module may determine the driver torque request based upon various inputs. When the driver request is increasing the present method is performed. The driver request from the accelerator pedal is converted to a driver torque request. For stability and drivability feel purposes, it is typical that the accelerator pedal is mapped to a driver engine torque request in a fashion that provides decreased torque as engine speed increases. It may have a shape that delivers a constant power versus an accelerator pedal percentage. This form of mapping operates well under most driving conditions except in vehicle launch where the engine speed is changing rapidly due to the hydrodynamic torque converter. Before vehicle launch begins the engine speed is at idle. When the driver first steps on the accelerator pedal the engine speed is still low and thus a high torque request is issued due to a power like mapping. When the engine torque starts to be achieved the engine speed rises quickly, where the driver torque request mapping from the accelerator pedal position yields a more moderate desired engine torque. However, because of the manifold delays in achieving predicted torque requests the higher torque is now achieved at the higher engine speed. A high torque output in combination with a high engine speed yields more power delivered than requested by the pedal interpretation. This gives the driver the feeling of an overly aggressive engine control system during the launch, followed by a quick deceleration as the system reacts to the torque overshoot.

A maximum torque capacity module 318 generates a maximum torque capacity for the engine without electric motor contributions. The maximum torque capacity may vary depending on the state. For example, an active fuel management state where cylinders may be disabled for efficiency or a cold start emission control state may have a different maximum torque than a normal mode state. The maximum torque may depend upon various vehicle operating conditions such as the current engine speed, the current air density, the current air-conditioning status state, the current turbo-boost state, the current coolant temperature and the fueling rate. For example, the maximum torque capacity module may estimate the maximum achievable air mass per cylinder and then translate that air mass into a maximum achievable torque using a torque model.

A launch trim torque threshold determination module 320 may determine a launch trim torque threshold above which a slow rate limit is applied to the raw driver intended torque requested and below which a fast rate limit is applied to the raw driver intended torque. The slow rate limit above the threshold is applied to limit the torque request while the engine speed and airflow actuators stabilize.

The launch trim torque threshold determination module 310 includes a percentage module 322. The percentage module 322 may use the accelerator effective position and the speed of the engine to determine a percentage. Thus, the percentage may vary and is not fixed over the operation of the engine. This percentage can be used to control the launch trim threshold to apply the optimal amount of torque request shaping only in the desired operating range. For example, when the driver steps heavily onto the accelerator pedal, the percentage should be raised to move the launch trim threshold up to a high level of torque to minimize rate limiting of the raw driver request. When the engine speed is above a threshold that is present in a normal launch condition, the percentage should be raised to move the launch trim threshold up to a high level of torque to minimize rate limiting of the raw driver request. This engine speed threshold may be known as the stall speed of the converter where the output shaft of the turbine is at 0 rpm.

Module 320 may also include an air density modifier module 324 that may generate an air density modifier. This air density modifier may be used to normalize the system when high air density is present to perform like the system when standard air density is present. This may be done because the function would be calibrated when standard air density is present.

The launch trim torque threshold module 326 may generate a launch trim torque threshold based upon the percentage from the percentage module and a maximum torque capacity from the maximum torque capacity module 318. The launch trim torque threshold is the torque that divides the two-state launch torque rate limiting function. The launch trim torque threshold may be modified by the air density modifier from air density modifier module 324. The air density modifier may move the launch trim threshold up or down depending on the conditions. For example, when the air density is very high due to cold ambient temperature or high barometric pressure, the modifier may adjust the launch trim threshold downward to produce a torque profile that is similar to standard pressure conditions.

The launch trim threshold torque may be communicated to the comparison module 328. The comparison module 328 compares the requested torque from the driver torque request module and the launch trim threshold torque from the launch trim threshold torque module 326.

The output module 312 may include a rate limiting module 340. When the requested torque is greater than the launch trim threshold torque, the rate limiting module 340 may rate limit the torque to a slower rate limit to slow down the torque request allowing the engine speed or airflow control to stabilize. When the requested torque is not greater than the launch trim threshold torque, then the raw driver request will be rate limited to a faster rate limit up to the launch trim threshold.

Figure 4:
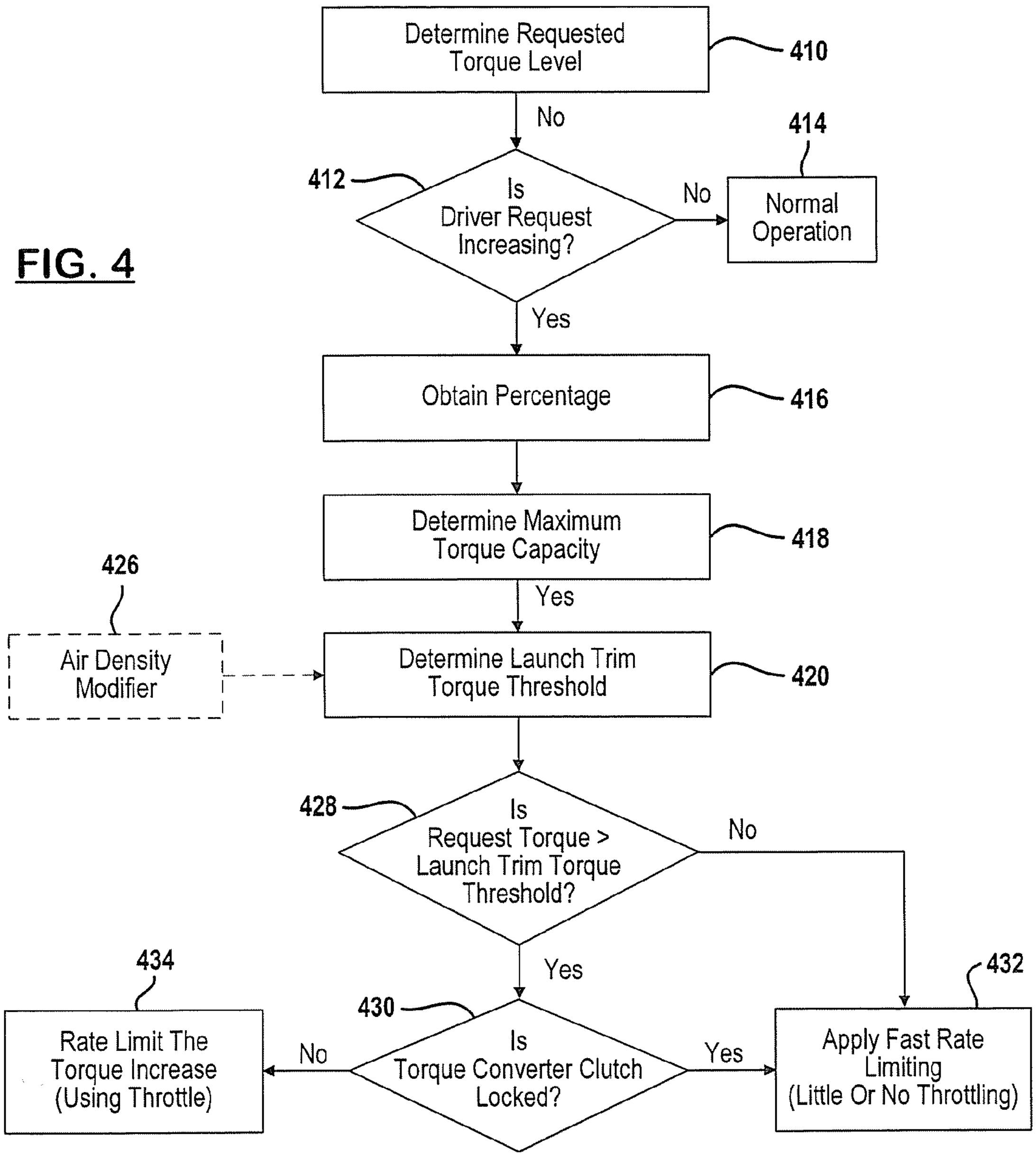
FIG. 4 is a flowchart of a method for performing the present disclosure.

Referring now to FIG. 4, a method for operating the present disclosure is set forth. In step 410, the driver requested torque level is determined. This is the raw or unshaped driver requested torque. Step 412 determines whether the raw driver torque request is greater than the rate limited output of the driver request function. If the driver torque request is not increasing in step 414, normal operation of the vehicle is performed that generates a normal torque request with normal shaping. In step 412, if the driver request is increasing a percentage may be determined in step 416. A percentage of the maximum engine torque may be determined using the speed of the engine and the accelerator pedal position. In step 418, the maximum torque capacity of the engine is determined. In step 420, the launch trim torque threshold is determined. The launch trim torque threshold may be a function of the percentage of the maximum engine torque and the maximum torque capacity. For example, the percentage from step 416 may be multiplied by the maximum torque capacity in step 418. The launch trim torque threshold may also be changed by an air density modifier 426. The air density modifier 426 may adjust upward or downward the launch trim torque threshold. Very dense air requires more throttling to achieve the same launch feel as standard temperature and pressure operating conditions. In step 428, it is determined whether the driver-requested torque is greater than the launch trim torque threshold. If the requested torque is not greater than the launch trim threshold torque, then step 432 applies a normal or fast rate limit up to the launch trim threshold.

In step 428, if the requested torque is greater than the launch trim torque threshold, step 430 determines whether the torque converter clutch is locked or is in a controlled slip mode. When the torque converter clutch is not locked, step 434 rate limits the torque request or torque increase. In step 430, if the torque converter clutch is locked or in a controlled slip mode, step 432 is performed as stated above.

Overshoot may exist in a natural state of control due to a very dynamic torque request from the pedal request. As a result, the delivered torque cannot achieve the request due to the manifold filling lag time. As the engine rpm increases rapidly, the pedal torque request may decrease rapidly. As mentioned above, it takes time for the manifold to fill with air after an increase in torque is requested. By the time the manifold has filled, the torque request may have been reduced due to the nature of the pedal torque request. It is common in some circumstances and, in fact, is the nature of manifold filling that under such dynamic conditions the actual torque delivered exceeds the decreasing request. This over-delivery of torque may produce an undesirable surge in acceleration. It is therefore desirable to eliminate this condition at vehicle launch to ensure a smooth acceleration.

Figure 5:
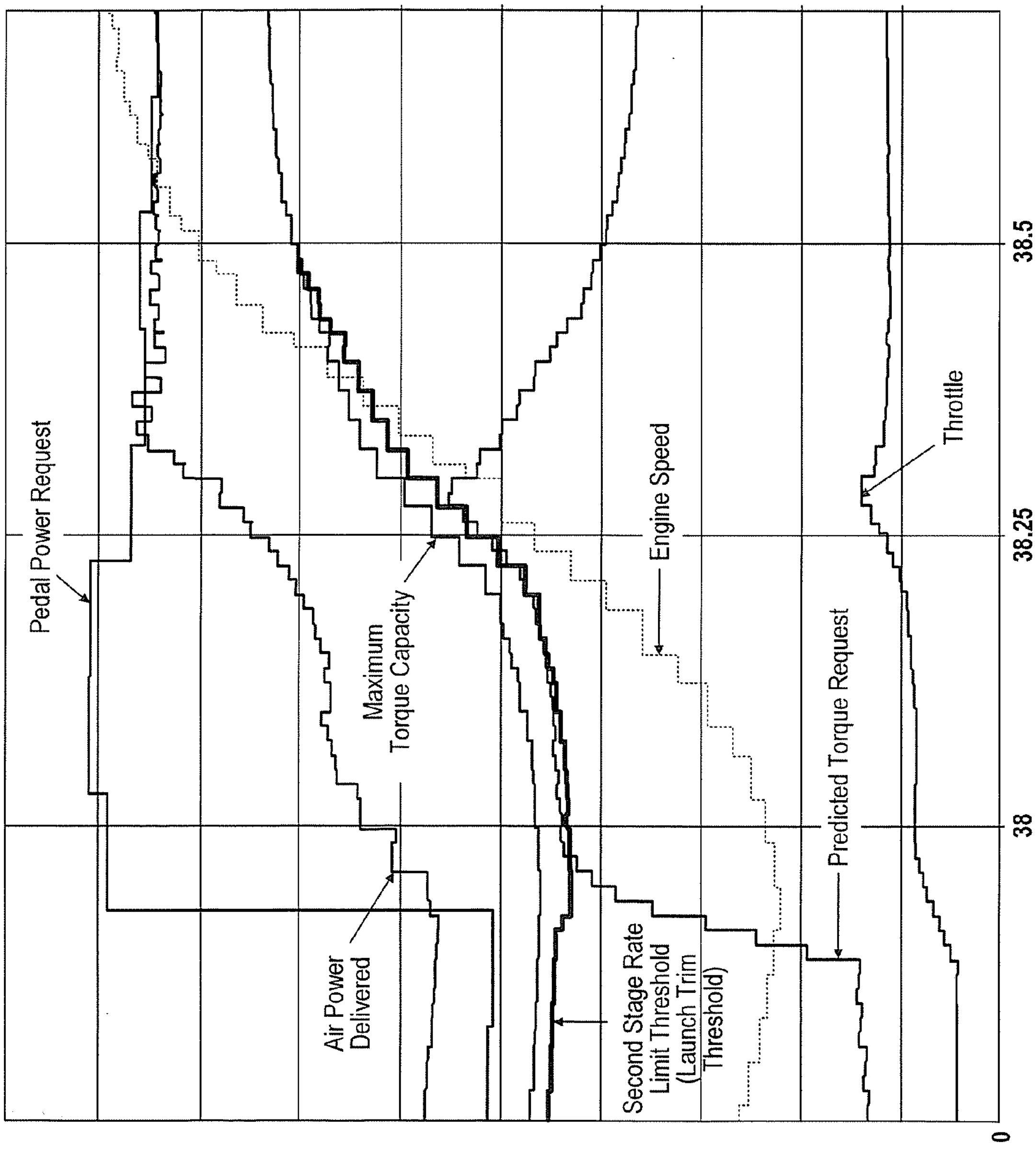
FIG. 5 is a plot of various signals including a second-stage rate limit threshold signal and a predicted torque request signal according to the present disclosure.

Referring now to FIG. 5, plots of the pedal power request, the air powered delivered, the speed of the engine, the maximum torque capacity, the two-stage rate limit threshold, the predicted torque request and the throttle signals are illustrated. As can be seen, the predicted torque request rate of increase changes at the second-stage rate limit threshold. As can be seen, the ultimate output is the predicted torque request signal. After the second-stage rate limit threshold, the maximum torque applied is rate limited so that the maximum torque capacity is not crossed. This prevents over-shoot of the predicted torque request and improves the overall launch feel of the vehicle. The double-stage rate limit allows quick initial response of the throttle, avoiding a hesitation, yet without torque and throttle overshoot. As mentioned above, the second-stage rate limit threshold may be turned off for aggressive launches by moving the launch torque threshold out of the way for large pedal inputs. By using the torque model, various environmental factors are factored into the maximum capacity torque.

The present method may also be used for hybrid vehicles. The predicted torque request may use the electric motor of a hybrid for aggressive launches when the launch trim threshold is set above the maximum capacity of the engine because higher pedal percentages are determined.

The present system does not require calibration for the various environmental and hardware conditions such as the air-conditioning state, the cold start emission control state, air density, coolant temperature and other conditions. The conditions are taken into consideration within the maximum torque capacity determination.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of controlling an engine comprising:
- generating a driver requested torque;
- determining a maximum torque capacity corresponding to a maximum torque capacity of the engine;
- determining a launch trim torque threshold;
- when the requested torque is less than the launch trim torque threshold, applying a fast rate limit to the driver requested torque up to the launch trim torque threshold; and
- when the requested torque is greater than the launch trim torque threshold, applying a slow rate limit to the driver requested torque.

2. A method as recited in claim 1 further comprising reducing torque overshoot by applying the slow rate limit.

3. A method as recited in claim 1 wherein generating a driver requested torque comprises generating the driver requested torque from an accelerator pedal position signal.

4. A method as recited in claim 1 wherein determining a maximum torque capacity comprises determining the maximum torque capacity based on an engine state.

5. A method as recited in claim 4 further comprising determining the engine state of at least one of an active fuel management state or a cold start emission control state.

6. A method as recited in claim 1 wherein determining a maximum torque capacity comprises determining the maximum torque capacity based on engine speed and an air density.

7. A method as recited in claim 1 wherein determining a maximum torque capacity comprises determining the maximum torque capacity based on engine speed, an air density and an air conditioning state.

8. A method as recited in claim 1 wherein determining a maximum torque capacity comprises determining the maximum torque capacity based on engine speed, an air density and a turbo boost status.

9. A method as recited in claim 1 wherein determining a maximum torque capacity comprises determining the maximum torque capacity based on engine speed, an air density and an engine coolant temperature.

10. A method as recited in claim 1 wherein determining a launch trim torque threshold comprises determining the launch trim torque threshold based on a maximum engine torque capacity and a desired percentage of the maximum torque capacity.

11. A method as recited in claim 10 further comprising determining the desired percentage of the maximum torque capacity based on the engine speed and an accelerator pedal position.

12. A method as recited in claim 1 wherein determining a launch trim torque threshold comprises determining the launch trim torque threshold based on an air density modifier.

13. A method as recited in claim 1 further comprising determining a torque clutch converter locked state or in a controlled slip state, when the clutch torque converter is in the locked state or controlled slip state, applying the fast rate limit to the driver request.

14. A control module comprising:

a requested torque module that generates a requested torque;

a maximum toque capacity module that determines a maximum torque capacity corresponding to a maximum torque capacity of an engine;

a launch trim torque threshold determination module that determines a launch trim torque threshold;

a comparison module that compares the requested torque and the launch trim torque threshold; and an output module that applies a fast rate limit to the requested torque up to the launch trim threshold when the requested torque is less than the launch trim torque threshold and a slow rate limited torque request when the requested torque is greater than the launch trim torque threshold.

15. A control module as recited in claim 14 wherein the launch trim torque threshold determination module comprises a percentage module determining a percentage and wherein the launch trim torque threshold based on the percentage and the maximum torque capacity.

16. A control module as recited in claim 15 wherein the percentage module determines the percent based on engine speed and an accelerator position signal.

17. A control module as recited in claim 14 wherein the launch trim threshold module determines the launch trim torque threshold based on an air density modifier.

18. A control module as recited in claim 14 wherein the output module reduces torque overshoot by applying the slow rate limit.

* * * * *